United States Patent
Choi et al.

(10) Patent No.: US 10,815,434 B2
(45) Date of Patent: Oct. 27, 2020

(54) SYSTEMS AND PROCESSES FOR POWER GENERATION

(71) Applicant: Saudi Arabian Oil Company, Dhahran (SA)

(72) Inventors: Ki-Hyouk Choi, Dhahran (SA); Abdullah T. Alabdulhadi, Dhahran (SA); Muneef F. AlQarzouh, Dhahran (SA); Mohannad H. Alabsi, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 298 days.

(21) Appl. No.: 15/840,525

(22) Filed: Dec. 13, 2017

(65) Prior Publication Data

US 2018/0187097 A1    Jul. 5, 2018

Related U.S. Application Data

(60) Provisional application No. 62/442,073, filed on Jan. 4, 2017.

(51) Int. Cl.
*C10G 31/08* (2006.01)
*F02C 3/30* (2006.01)
(Continued)

(52) U.S. Cl.
CPC ............... *C10G 31/08* (2013.01); *F02C 3/00* (2013.01); *F02C 3/30* (2013.01);
(Continued)

(58) Field of Classification Search
CPC .................................................. C10G 31/08
See application file for complete search history.

(56) References Cited

U.S. PATENT DOCUMENTS

| | | |
|---|---|---|
| 3,909,208 A | 9/1975 | Boret et al. |
| 4,465,888 A | 8/1984 | Paspek, Jr. |

(Continued)

FOREIGN PATENT DOCUMENTS

| | | |
|---|---|---|
| CA | 2938409 A1 | 8/2015 |
| CN | 1281839 | 1/2001 |

(Continued)

OTHER PUBLICATIONS

Notice of Allowance and Fee(s) Due dated Mar. 4, 2019 pertaining to U.S. Appl. No. 16/049,983, filed Jul. 31, 2018, 7 pgs.

(Continued)

*Primary Examiner* — Renee Robinson
(74) *Attorney, Agent, or Firm* — Dinsmore & Shohl

(57) ABSTRACT

Processes for generating electric power are provided. The processes involve combining a supercritical water stream with a pressurized, heated hydrocarbon-based composition in a mixing device to create a combined feed stream. The combined feed stream is introduced to a supercritical reactor to produce an upgraded product. The upgraded product is depressurized and separated. The upgraded product may be separated into a light and heavy fraction where the light may be introduced to a gas turbine to generate electric power and the heavy fraction may be introduced to a boiler to generate electric power, or both. Alternatively, the depressurized upgraded product may be further separated to produce a fuel oil fraction comprised of cutterstock and a heavy fraction which may be passed to a boiler to generate electric power, and a light fraction, which may be passed to a gas turbine system to generate electric power, or both.

12 Claims, 5 Drawing Sheets

(51) Int. Cl.
*F02C 3/00* (2006.01)
*F01K 23/00* (2006.01)
*F22B 1/18* (2006.01)
*F01K 27/02* (2006.01)

(52) U.S. Cl.
CPC ............... *C10G 2300/205* (2013.01); *C10G 2300/4006* (2013.01); *C10G 2300/4012* (2013.01); *F01K 23/00* (2013.01); *F01K 27/02* (2013.01); *F05D 2220/32* (2013.01); *F05D 2220/76* (2013.01); *F05D 2240/35* (2013.01); *F22B 1/1807* (2013.01); *Y02E 20/363* (2013.01)

(56) References Cited

U.S. PATENT DOCUMENTS

| | | | |
|---|---|---|---|
| 4,591,426 | A | 5/1986 | Krasuk et al. |
| 4,822,497 | A | 4/1989 | Hong et al. |
| 5,387,398 | A | 2/1995 | Mueggenburg et al. |
| 5,454,950 | A | 10/1995 | Li et al. |
| 6,039,791 | A | 3/2000 | Kazeef et al. |
| 6,299,759 | B1 | 10/2001 | Bradway et al. |
| 6,306,287 | B1 | 10/2001 | Billon et al. |
| 6,332,975 | B1 | 12/2001 | Abdel-Halim et al. |
| 6,365,790 | B2 | 4/2002 | Reimer et al. |
| 7,041,707 | B2 | 5/2006 | Hahn |
| 7,435,330 | B2 | 10/2008 | Hokari et al. |
| 7,591,983 | B2 | 9/2009 | Takahashi et al. |
| 7,594,387 | B2 | 9/2009 | Inage et al. |
| 7,740,065 | B2 | 6/2010 | Choi |
| 9,382,485 | B2 | 7/2016 | Choi et al. |
| 2002/0020359 | A1 | 2/2002 | Boyer et al. |
| 2005/0040081 | A1* | 2/2005 | Takahashi ............... B01J 3/008 208/251 R |
| 2006/0260927 | A1 | 11/2006 | Abazajian |
| 2008/0099374 | A1 | 5/2008 | He et al. |
| 2008/0099376 | A1 | 5/2008 | He et al. |
| 2008/0099378 | A1 | 5/2008 | He et al. |
| 2009/0139715 | A1* | 6/2009 | Choi ............... C10G 9/00 166/272.1 |
| 2009/0139902 | A1 | 6/2009 | Kressmann et al. |
| 2009/0159489 | A1 | 6/2009 | Lopez et al. |
| 2009/0159498 | A1 | 6/2009 | Chinn et al. |
| 2009/0159504 | A1 | 6/2009 | Choi et al. |
| 2009/0166262 | A1 | 7/2009 | He et al. |
| 2011/0147266 | A1 | 6/2011 | Choi |
| 2012/0061291 | A1 | 3/2012 | Choi et al. |
| 2012/0061294 | A1 | 3/2012 | Choi et al. |
| 2012/0181217 | A1 | 7/2012 | Choi et al. |
| 2013/0140214 | A1 | 6/2013 | Choi |
| 2013/0206645 | A1 | 8/2013 | Yarbro |
| 2013/0319910 | A1 | 12/2013 | Koseoglu et al. |
| 2014/0135540 | A1 | 5/2014 | Iversen |
| 2014/0251871 | A1 | 9/2014 | Choi et al. |
| 2014/0275676 | A1 | 9/2014 | Sieli et al. |
| 2015/0258517 | A1 | 9/2015 | Degaleesan et al. |
| 2015/0321975 | A1 | 11/2015 | Choi et al. |
| 2016/0312129 | A1 | 10/2016 | Choi et al. |
| 2017/0107433 | A1 | 4/2017 | Choi et al. |
| 2017/0166821 | A1 | 6/2017 | Choi et al. |

FOREIGN PATENT DOCUMENTS

| | | |
|---|---|---|
| CN | 103180415 A | 6/2013 |
| EP | 1 342 771 A1 | 9/2003 |
| EP | 1 616 931 A1 | 1/2006 |
| EP | 1696019 A1 | 8/2006 |
| GB | 1298904 A | 12/1972 |
| JP | 2000109850 | 4/2000 |
| JP | 2003049180 | 2/2003 |
| KR | 100249496 B1 | 12/1999 |
| WO | 2008055152 A1 | 5/2008 |
| WO | 2013033301 A2 | 3/2013 |
| WO | 2015094948 A1 | 6/2015 |

OTHER PUBLICATIONS

Chinese Office Action dated Jan. 30, 2019 pertaining to CN Application No. 201680077934.2.
Office Action pertaining to U.S. Appl. No. 15/840,519 dated Apr. 5, 2019.
International Search Report dated Mar. 23, 2018 for International Application No. PCT/US2017/068464, filed Dec. 27, 2017, 6 pages.
Written Opinion dated Mar. 23, 2018 for International Application No. PCT/US2017/068464, filed Dec. 27, 2017, 5 pages.
Office Action pertaining to U.S. Appl. No. 15/448,913 dated Nov. 13, 2018.
Official Action/Invitation to Respond to Written Opinion dated May 27, 2019 pertaining to Singapore Divisional Patent Application No. 10201902799Q.
Notice of Allowance and Fees(s) Due dated Apr. 9, 2019 pertaining to U.S. Appl. No. 15/448,913, filed Mar. 3, 2017, 11 pgs.
Office Action dated May 3, 2019 pertaining to U.S. Appl. No. 15/448,961, filed Mar. 3, 2017, 46 pgs.
Abdulrazak et al., "Problems of Heavy Oil Transportation in Pipelines and Reduction of High Viscosity", Iraqi Journal of Chemical and Petroleum Engineering, 2015, vol. 16, No. 3, 1-9.
Ates et al., "The Role of Catalyst in Supercritical Water Desulfurization", Applied Catalysis B: Environmental, 2014, 147, 144-155, Elsevier B.V.
Badger et al., "Viscosity Reduction in Extra Heavy Crude Oils", 461-465, the Laboratory for Hydrocarbon Process Chemistry, the Pennsylvania State University.
Escallon, Maria M., "Petroleum and Petroleum/Coal Blends as Feedstocks in Laboratory-Scale and Pilot-Scale Cokers to Obtain Carbons of Potentially High Value", a Thesis in Fuel Science, 2008, the Pennsylvania State University Graduate School.
Gateau et ala, "Heavy Oil Dilution", Oil & Gas Science and Technology, 2004, vol. 59, No. 5, 503-509.
Hughes et al., "Conocophillips Delayed Coking Process", Handbook of Petroleum Refining Processes, 2003, Chapte 12, 3rd Edition, 12.3-12.31, McGraw-Hill, New York (NY).
International Search Report and Written Opinion pertaining to PCT/US2016/066129 dated Mar. 13, 2017.
International Search Report and Written Opinion pertaining to PCT/US2016/066132 dated Mar. 21, 2017.
International Search Report and Written Opinion pertaining to PCT/US2016/066294 dated Mar. 21, 2017.
Iqbal et al., "Unlocking Current Refinery Constraints", PTQ Q2 2008, www.digitalrefining.com/article/1000682.
Kishita et al., "Desulfurization of Bitumen by Hydrothermal Upgrading Process in Supercritical Water with Alkali", Journal of the Japan Petroleum Institute, 2006, 49 (4), 1779-185.
International Search Report and Written Opinion pertaining to PCT/US2016/066367 dated Nov. 10, 2017.
Office Action pertaining to U.S. Appl. No. 15/374,295 dated Oct. 31, 2017.
Office Action pertaining to U.S. Appl. No. 15/374,203 dated Oct. 31, 2017.
Notice of Allowance pertaining to U.S. Appl. No. 15/377,351 dated Nov. 7, 2017.
Examination Report dated Aug. 29, 2019 which pertains to GCC Patent Application No. 2018/34570.
Notice of Allowance and Fee(s) Due dated Sep. 16, 2019 pertaining to U.S. Appl. No. 15/448,961, filed Mar. 3, 2017, 23 pgs.
Notice of Allowance and Fee(s) Due dated Oct. 21, 2019 pertaining to U.S. Appl. No. 15/840,519, filed Dec. 13, 2017, 34 pgs.
Office Action dated Jul. 25, 2019 pertaining to U.S. Appl. No. 16/451,957, filed Jun. 25, 2019, 12 pgs.
Examination Report pertaining to GCC Patent Application No. 2016/35416, filed Dec. 15, 2016, 3 pages.
Notice of Allowance and Fees Due dated May 14, 2018 pertaining to U.S. Appl. No. 15/374,289.
International Search Report pertaining to PCT International Application No. PCT/US2018/012027, filed Jan. 2, 2018, 5 pages.
Written Opinion pertaining to PCT International Application No. PCT/US2018/012027, filed Jan. 2, 2018, 6 pages.

(56) References Cited

OTHER PUBLICATIONS

Final Office Action dated Mar. 16, 2018, pertaining to U.S. Appl. No. 15/374,295, filed Dec. 9, 2016, 13 pages.
Notice of Allowance dated Mar. 22, 2018, pertaining to U.S. Appl. No. 15/374,203, filed Dec. 9, 2016, 8 pages.
Notice of Allowance and Fee(s) Due dated Dec. 31, 2019 pertaining to U.S. Appl. No. 16/451,957, filed Jun. 25, 2019, 27 pgs.
Chinese Office Action pertaining to Application No. 201810846253.9, dated Jul. 3, 2020, 6 pages.

* cited by examiner

SYSTEMS AND PROCESSES FOR POWER GENERATION

CROSS-REFERENCE TO RELATED APPLICATIONS

This application claims priority to U.S. Provisional Patent Application Ser. No. 62/442,073, filed Jan. 4, 2017, which is incorporated by reference in its entirety.

TECHNICAL FIELD

Embodiments of the present disclosure generally relate to systems and processes for power generation. Specifically, embodiments of the present disclosure relate to systems and processes for converting hydrocarbon-based compositions into fuel for power generation.

BACKGROUND

The exponentially increasing consumption of energy has created a continuous demand for efficient power generation. The main source of electricity generation comes from hydrocarbons, such as liquid fuel and natural gas, which can be combusted to generate heat and gas that is converted to electricity or other types of energy. Heavy crude oil is a suitable and economically feasible option for power generation; however, to minimize air pollution, the fuels used in combustion are highly regulated and unaltered heavy crude oil does not meet these standards. In conventional processes, refineries must be used to process the crude oil into suitable fuel for use in turbines and boilers.

SUMMARY

Accordingly, a need exists for a process for upgrading and separating usable components from heavy crude oil such that the heavy crude may be used in power generation systems.

In accordance with one embodiment of the present disclosure, a process for generating electric power is provided. The process involves combining a supercritical water stream with a pressurized, heated hydrocarbon-based composition in a mixing device to create a combined feed stream. The combined feed stream is introduced to a supercritical reactor to produce an upgraded product. The supercritical reactor operates at a temperature greater than the critical temperature of water and a pressure greater than the critical pressure of water. The upgraded product is depressurized and separated into at least one light and at least one heavy fraction, where the hydrocarbons in the light fraction have an American Petroleum Institute (API) gravity value that is greater than the API gravity value of the hydrocarbons in the heavy fraction. At least some of the heavy fraction is introduced to a boiler to generate electric power, at least some of the light fraction is introduced to a gas turbine to generate electric power, or both.

In another embodiment of the present disclosure, another process for generating electric power is provided. The process involves combining a supercritical water stream with a pressurized, heated hydrocarbon-based composition in a mixing device to create a combined feed stream. The combined feed stream is introduced to a supercritical reactor to produce an upgraded product. The supercritical reactor operates at a temperature greater than the critical temperature of water and a pressure greater than the critical pressure of water. The upgraded product is depressurized and separated by a gas/oil/water separator to produce at least a gas fraction, a liquid oil fraction, and a water fraction. The liquid oil fraction is separated in a distillation unit to produce a light oil fraction, a cutterstock fraction, and a heavy oil fraction. The cutterstock fraction and the heavy fraction are combined to produce a fuel oil. The fuel oil may be passed to a boiler to generate electric power, the light oil fraction may be passed to a gas turbine system to generate electric power, or both.

Although the concepts of the present disclosure are portrayed with primary reference to boilers, gas turbines, compressor units, combustor units and the like, it is contemplated that the concepts will enjoy applicability to systems having any configuration or methodology.

BRIEF DESCRIPTION OF THE DRAWINGS

The following detailed description of specific embodiments of the present disclosure can be best understood when read in conjunction with the following drawings, in which.

DETAILED DESCRIPTION

Figure 1:
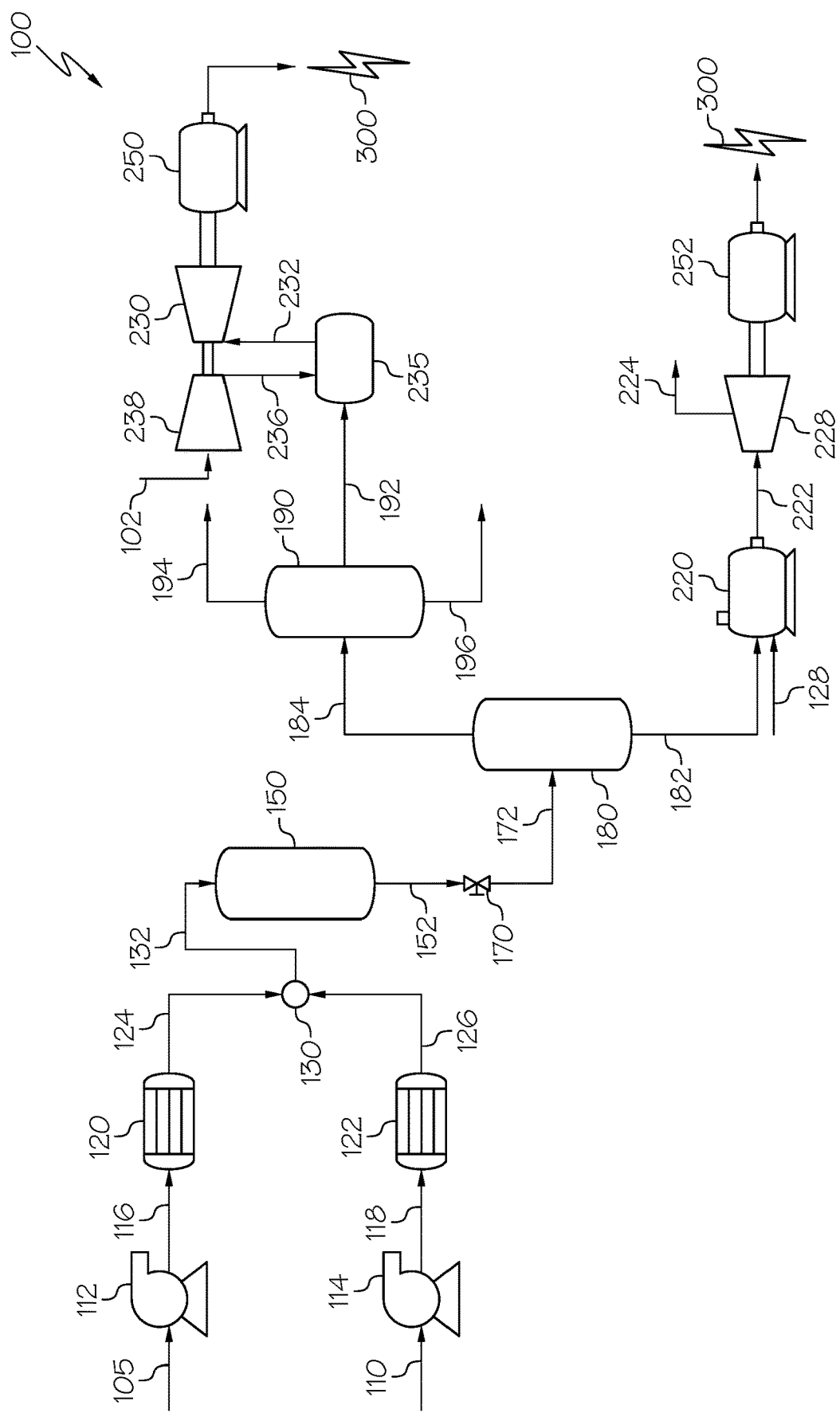
FIG. 1 is a schematic view of a process for generating power, according to the present embodiments.

Embodiments of the present disclosure are directed to processes for generating electric power. Some embodiments include generating electric power by upgrading a hydrocarbon-based composition using supercritical water upgrading reactors, separating the composition and using the upgraded and separated hydrocarbon-based composition as fuel for generating electric power. Without being limited to industrial application, the present disclosure may process hydrocarbon-based compositions into fractions used to fuel gas turbines and steam boilers to generate electric power. The present disclosure provides processes for generating energy by separating and utilizing components of a hydrocarbon-based composition, which may, in some embodiments, be crude oil. In some embodiments, the present disclosure may be able to produce more fuel than conventional processes by using supercritical water to efficiently and effectively upgrade the hydrocarbon-based compositions. In some embodiments, the present disclosure may additionally introduce the fuel components to a turbine and boiler at a high temperature, reducing or eliminating a need for pre-heating.

As used throughout the disclosure, "supercritical" refers to a substance at or above a pressure and a temperature greater than or equal to that of its critical pressure and temperature, such that distinct phases do not exist and the substance may exhibit the fast diffusion of a gas while dissolving materials like a liquid. As such, supercritical water is water having a temperature and pressure greater than or equal to the critical temperature and the critical pressure of water. At a temperature and pressure greater than or equal to the critical temperature and pressure, the liquid and gas phase boundary of water disappears, and the fluid has characteristics of both liquid and gaseous substances. Supercritical water is able to dissolve organic compounds like an organic solvent and has excellent diffusibility like a gas. Regulation of the temperature and pressure allows for continuous "tuning" of the properties of the supercritical water to be more liquid-like or more gas-like. Supercritical water has reduced density and lesser polarity, as compared to liquid-phase sub-critical water, thereby greatly extending the possible range of chemistry that can be carried out in water.

Supercritical water has various unexpected properties as it reaches supercritical boundaries. Supercritical water has very high solubility toward organic compounds and has an infinite miscibility with gases. Furthermore, radical species can be stabilized by supercritical water through the cage effect (that is, a condition whereby one or more water molecules surrounds the radical species, which then prevents the radical species from interacting). Without being limited to theory, stabilization of radical species helps prevent inter-radical condensation and thereby reduces the overall coke production in the current embodiments. For example, coke production can be the result of the inter-radical condensation. In certain embodiments, supercritical water generates hydrogen gas through a steam reforming reaction and water-gas shift reaction, which is then available for the upgrading reactions.

Moreover, the high temperature and high pressure of supercritical water may give water a density of 0.123 grams per milliliter (g/mL) at 27 MPa and 450° C. Contrastingly, if the pressure was reduced to produce superheated steam, for example, at 20 MPa and 450° C., the steam would have a density of only 0.079 g/mL. At that density, the hydrocarbons may interact with superheated steam to evaporate and mix into the liquid phase, leaving behind a heavy fraction that may generate coke upon heating. The formation of coke or coke precursor may plug the lines and must be removed. Therefore, supercritical water is superior to steam in some applications.

Specific embodiments will now be described with references to the figures. Whenever possible, the same reference numerals will be used throughout the drawings to refer to the same or like parts.

FIG. 1 schematically depicts a process 100 for generating power by utilizing a hydrocarbon-based composition 105 that is upgraded in a supercritical upgrading reactor 150, according to embodiments described.

The hydrocarbon-based composition 105 may refer to any hydrocarbon source derived from petroleum, coal liquid, or biomaterials. Possible sources for hydrocarbon-based composition 105 may include crude oil, distilled crude oil, reduced crude oil, residue oil, topped crude oil, product streams from oil refineries, product streams from steam cracking processes, liquefied coals, liquid products recovered from oil or tar sands, bitumen, oil shale, asphaltene, biomass hydrocarbons, and the like. Many compositions are suitable for the hydrocarbon-based composition 105. In some embodiments, the hydrocarbon-based composition 105 may comprise heavy crude oil or a fraction of heavy crude oil. In other embodiments, the hydrocarbon-based composition 105 may include atmospheric residue (AR), atmospheric distillates, vacuum gas oil (VGO), vacuum distillates, or vacuum residue (VR), or cracked product (such as light cycle oil or coker gas oil). In some embodiments, the hydrocarbon-based composition 105 may be combined streams from a refinery, produced oil, or other hydrocarbon streams, such as from an upstream operation. The hydrocarbon-based composition 105 may be decanted oil, oil containing 10 or more carbons (C10+ oil), or hydrocarbon streams from an ethylene plant. The hydrocarbon-based composition 105 may, in some embodiments, be liquefied coal or biomaterial-derivatives, such as bio fuel oil. In some embodiments, used lubrication (lube) oil or brake fluids may be used.

The hydrocarbon-based composition 105 may, in some embodiments, be naptha or kerosene fractions. Diesel fractions may be used but may not be upgraded as significantly by the supercritical water and thus may not be desired. Contaminated hydrocarbon fractions may also be used. In some embodiments, fractions with saltwater contamination may be used as the hydrocarbon-based composition 105. For instance, crude oil in market typically has a salt content below about 10 PTB (pounds of salt per 1000 barrels of oil). The saltwater may be precipitated by the supercritical water to produce a desalted product, which may be desirable in some embodiments.

As shown in FIG. 1, a hydrocarbon-based composition 105 may be pressurized in hydrocarbon pump 112 to create a pressurized hydrocarbon-based composition 116. The pressure of pressurized hydrocarbon-based composition 116 may be at least 22.1 megapascals (MPa), which is approximately the critical pressure of water. Alternatively, the pressure of the pressurized hydrocarbon-based composition 116 may be between 23 MPa and 35 MPa, or between 24 MPa and 30 MPa. For instance, the pressure of the pressurized hydrocarbon-based composition 116 may be between 25 MPa and 29 MPa, 26 MPa and 28 MPa, 25 MPa and 30 MPa, 26 MPa and 29 MPa, or 24 MPa and 28 MPa.

Referring again to FIG. 1, the pressurized hydrocarbon-based composition 116 may then be heated in one or more hydrocarbon pre-heaters 120 to form pressurized, heated hydrocarbon-based composition 124. In one embodiment, the pressurized, heated hydrocarbon-based composition 124 has a pressure greater than the critical pressure of water and a temperature greater than 75° C. Alternatively, the temperature of the pressurized, heated hydrocarbon-based composition 124 is between 10° C. and 300° C., or between 50° C. and 250° C., or between 75° C. and 225° C., or between 100° C. and 200° C., or between 125° C. and 175° C., or between 140° C. and 160° C. The pressurized, heated hydrocarbon-based composition 124 should not be heated above about 350° C., and in some embodiments, above 300° C. to avoid the formation of coking products. See Hozuma, U.S. Pat. No. 4,243,633, which is incorporated by reference in its entirety. While some coke or coke precursor products may be able to pass through process lines without slowing or stopping the process 100, the formation of these potentially problematic compounds should be avoided if possible.

Embodiments of the hydrocarbon pre-heater 120 may include a natural gas fired heater, heat exchanger, or an electric heater or any type of heater known in the art. In some embodiments, the pressurized, heated hydrocarbon-based composition 124 is heated in a double pipe heat exchanger later in the process.

As shown in FIG. 1, the water stream 110 may be any source of water, such as a water stream having conductivity of less than 1 microsiemens ($\mu$S)/centimeters (cm), such as less than 0.1 $\mu$S/cm. The water streams 110 may also include demineralized water, distilled water, boiler feed water (BFW), and deionized water. In at least one embodiment, water stream 110 is a boiler feed water stream. Water stream 110 is pressurized by water pump 114 to produce pressurized water stream 118. The pressure of the pressurized water stream 118 is at least 22.1 MPa, which is approximately the critical pressure of water. Alternatively, the pressure of the pressurized water stream 118 may be between 23 MPa and 35 MPa, or between 24 MPa and 30 MPa. For instance, the pressure of the pressurized water stream 118 may be between 25 MPa and 29 MPa, 26 MPa and 28 MPa, 25 MPa and 30 MPa, 26 MPa and 29 MPa, or 24 MPa and 28 MPa.

Referring again to FIG. 1, the pressurized water stream 118 may then be heated in a water pre-heater 122 to create a supercritical water stream 126. The temperature of the supercritical water stream 126 is greater than 374° C., which is approximately the critical temperature of water. Alternatively, the temperature of the supercritical water stream 126 may be greater than 380° C., such as between 380° C. and 600° C., or between 400° C. and 550° C., or between 400° C. and 500° C., or between 400° C. and 450° C., or between 450° C. and 500° C. In some embodiments, the maximum temperature of the supercritical water stream 126 may be 600° C., as the mechanical parts in the supercritical reactor system may be affected by temperatures greater than 600° C.

Similar to hydrocarbon pre-heater 120, suitable water pre-heaters 122 may include a natural gas fired heater, a heat exchanger, and an electric heater. The water pre-heater 122 may be a unit separate and independent from the hydrocarbon pre-heater 120.

Referring again to FIG. 1, the supercritical water stream 126 and the pressurized, heated hydrocarbon-based composition 124 may be mixed in a feed mixer 130 to produce a combined feed stream 132. The feed mixer 130 can be any type of mixing device capable of mixing the supercritical water stream 126 and the pressurized, heated hydrocarbon-based composition 124. In one embodiment, the feed mixer 130 may be a mixing tee. The feed mixer 130 may be an ultrasonic device, a small continuous stir tank reactor (CSTR), or any suitable mixer. The volumetric flow ratio of supercritical water to hydrocarbons fed to the feed mixer 130 may vary. In one embodiment, the volumetric flow ratio may be from 10:1 to 1:10, or 5:1 to 1:5, 1:1 to 4:1 at standard ambient temperature and pressure (SATP).

Still referring to FIG. 1, the combined feed stream 132 may then be introduced to the supercritical upgrading reactor 150 configured to upgrade the combined feed stream 132.

The supercritical upgrading reactor 150 may be an upflow, downflow, or horizontal flow reactor. An upflow, downflow or horizontal reactor refers to the direction the supercritical water and petroleum-based composition flow through the supercritical upgrading reactor 150. An upflow, downflow, or horizontal flow reactor may be chosen based on the desired application and system configuration. Without intending to be bound by any theory, in downflow supercritical reactors, heavy hydrocarbon fractions may flow very quickly due to having a greater density, which may result in shortened residence times (known as channeling). This may hinder upgrading, as there is less time for reactions to occur. Upflow supercritical reactors have an increased residence time, but may experience difficulties due to large particles, such as carbon-containing compounds in the heavy fractions, accumulating in the bottom of the reactor. This accumulation may hinder the upgrading process and plug the reactor. Upflow reactors typically utilize catalysts to provide increased contact with the reactants; however, the catalysts may break down due to the harsh conditions of supercritical water, forming insoluble aggregates, which may generate coke. Horizontal reactors may be useful in applications that desire phase separation or that seek to reduce pressure drop, however; the separation achieved may be limited. Each type of reactor flow has positive and negative attributes that vary based on the applicable process; however, in some embodiments, an upflow or downflow reactor may be favored.

The combined feed stream 132 is introduced through an inlet port of the supercritical upgrading reactor 150. The supercritical upgrading reactor 150 may operate at a temperature greater than the critical temperature of water and a pressure greater than the critical pressure of water. In one or more embodiments, the supercritical upgrading reactor 150 may have a temperature of between 380° C. to 480° C., or between 390° C. to 450° C. The supercritical upgrading reactor 150 may be an isothermal or non-isothermal reactor. The reactor may be a tubular-type vertical reactor, a tubular-type horizontal reactor, a vessel-type reactor, a tank-type reactor having an internal mixing device, such as an agitator, or a combination of any of these reactors. Moreover, additional components, such as a stirring rod or agitation device may also be included in the supercritical upgrading reactor 150.

The supercritical upgrading reactor 150 may have dimensions defined by the equation L/D, where L is a length of the supercritical upgrading reactor 150 and D is the diameter of the supercritical upgrading reactor 150. In one or more embodiments, the L/D value of the supercritical upgrading reactor 150 may be sufficient to achieve a superficial velocity of fluid greater than 0.5 meter (m)/minute (min), or an L/D value sufficient to achieve a superficial velocity of fluid between 1 m/min and 5 m/min. The fluid flow may be defined by a Reynolds number greater than 5000.

In some embodiments, the residence time of the internal fluid in the supercritical upgrading reactor 150 may be longer than 5 seconds, such as longer than 1 minute. In some embodiments, the residence time of the internal fluid in the supercritical upgrading reactor 150 may be between 2 and 30 minutes, such as between 2 and 20 minutes or between 5 and 15 minutes or between 5 and 10 minutes.

Referring to FIG. 1, upon exiting the reactor, the pressure of the reactor product 152 of the supercritical upgrading reactor 150 may be reduced to create a depressurized stream 172, which may have a pressure from 0.05 MPa to 2.2 MPa. The depressurizing can be achieved by many devices, for example, a valve 170 as shown in FIG. 1. Optionally, the reactor product 152 may be cooled to a temperature less than 200° C. in a cooler (not shown) upstream of the valve 170. Various cooling devices are contemplated for the cooler, such as a heat exchanger.

Referring again to FIG. 1, the depressurized stream 172 may then be fed to a light/heavy separator 180 to separate the depressurized stream 172 into a heavy fraction 182 and a light fraction 184. Various light/heavy separators 180 are contemplated, for example, a flash drum or distillation unit.

In some embodiments, the light fraction 184 and the heavy fraction 182 may be liquid-containing fractions. In some embodiments, the hydrocarbons in the light fraction 184 have an API gravity value that is greater than those in the heavy fraction 182. API gravity is a measure of how heavy or light petroleum liquid is when compared to water based on the density relative to water (also known as specific gravity). API gravity can be calculated in accordance with Equation 1 as follows:

$$API\ Gravity = \frac{141.5}{(\text{Specific Gravity at } 60° \text{ F.})} - 131.5 \quad \text{EQUATION 1}$$

API gravity is a dimensionless quantity that is referred to by degrees, with most petroleum liquids falling between 10° and 70°. In some embodiments, the hydrocarbons in the light fraction 184 may have an API gravity value of greater than or equal to 30°. The hydrocarbons in the light fraction 184 may have an API gravity value from 30° to 40°, 30° to 45°, or from 30° to 50°, or from 30° to 70°. In some embodiments, the hydrocarbons in the light fraction 184 may have an API value of greater than or equal to 31°, such as 31.1°. In some embodiments, the hydrocarbons in the light fraction 184 may have an API value of from 40° to 45°, which may be very commercially desirable. In some embodiments, it may be desirable that the hydrocarbons in the light fraction 184 have an API value of less than 45°. Without being bound by theory, when the API value is greater than 45°, the molecular chains of the hydrocarbons in the light fraction 184 may become shorter and less commercially valuable as liquid product.

The hydrocarbons in the heavy fraction 182 may have an API gravity value of less than or equal to 30°. For instance, the hydrocarbons in the heavy fraction 182 may have an API gravity value of less than 30° and greater than or equal to 1°. In some embodiments, the hydrocarbons in the heavy fraction 182 may have an API value from 1° to 10°, or 2° to 20° or 4° to 8°. The hydrocarbons in the heavy fraction 182 may have an API gravity value of less than or equal to 20°, less than or equal to 15°, or less than or equal to 10°.

In some embodiments, the hydrocarbons in the light fraction 184 may have a $T_5$ true boiling point (TBP), referring to when at least 5% of the fraction has evaporated, of less than or equal to 500° C. For instance, the hydrocarbons in the light fraction 184 may have a $T_5$ TBP of less than or equal to 490° C. or less than or equal to 489° C. In some embodiments, the hydrocarbons in the light fraction 184 may have a $T_5$ TBP of less than or equal to 150° C., such as less than or equal to 125° C., less than or equal to 75° C., or less than or equal to 50° C. The hydrocarbons in the light fraction 184 may have a $T_{90}$ TBP of less than or equal to 500° C., or less than or equal to 490° C., or less than or equal to 485° C., or less than or equal to 480° C., or less than or equal to 475° C.

In some embodiments, the hydrocarbons in the heavy fraction 182 may have a $T_5$ TBP of greater than or equal to 430° C., such as from 430° C. to 560° C. The hydrocarbons in the heavy fraction 182 may have a $T_5$ TBP of greater than or equal to 450° C., or greater than or equal to 500° C., or less than or equal to 560° C. The hydrocarbons in the heavy fraction 182 may have a $T_{90}$ TBP, referring to when at least 90% of the fraction has evaporated, of less than or equal to 900° C., such as less than or equal to 890° C., or less than or equal to 885° C., or less than or equal to 875° C.

Referring again to FIG. 1, the light fraction 184 may be passed to a gas/oil/water separator 190. The gas/oil/water separator 190 may separate the light fraction 184 into a gas fraction 194, a liquid oil fraction 192, and a water fraction 196. The gas/oil/water separator 190 may be any separator known in the industry. While the gas/oil/water separator 190 may separate the light fraction into at least a gas fraction 194, a liquid oil fraction 192, and a water fraction 196, it should be appreciated that additional fractions may also be produced.

In some embodiments, the liquid oil fraction 192 may be passed to a gas turbine 230. Various gas turbine systems and devices are contemplated. As shown in the embodiment of FIG. 1, the gas turbine 230 is driven by a combustor 235. The liquid oil fraction 192 may be fed as fuel to the combustor 235 along with compressed air 236. A compressor 238 may compress inlet air 102 to produce compressed air 236. The combustor 235 generates heated compressed air 232 which drives the rotating blades of the gas turbine 230 to generate mechanical energy. The mechanical energy may be passed to the electric generator 250 and converted into electric energy 300.

In some embodiments, at least a portion of the liquid oil fraction 192 may be suitable to power the gas turbine 230 without additional processing or purification steps. Without being bound by theory, the liquid oil fraction 192 may meet the specifications required of gas turbine fuels due to the upgrading process of the supercritical upgrading reactor 150.

As previously mentioned, gas turbine fuels are heavily regulated due to concerns regarding corrosion and pollution. The high temperatures of the gas turbine systems can accelerate unwanted reactions, such as those that cause corrosion and pollution. For instance, the sulfur content in liquid fuel may be converted to $SO_x$ by combustion, which is an air pollutant. Likewise, metallic compounds such as vanadium and nickel in the fuel can also converted to oxide-based materials, and may further react with sulfur and nitrogen to generate sulfate and nitrate, which are also environmental hazards.

To comply with these standards, the liquid oil fraction 192, before being passed to the gas turbine 230, may have a metal content of less than 10 weight parts per million (wt ppm) metal. In some embodiments, the liquid oil fraction 192 may have a vanadium content of less than or equal to 0.5 wt ppm, a calcium content of less than or equal to 2 wt ppm and a combined sodium and potassium content of less than or equal to 1 wt ppm. The liquid oil fraction 192 may have an ash content of less than or equal to 100 wt ppm, or less than or equal to 75 wt ppm. Total ash content may be regulated to prevent plugging and other mechanical problems. In some embodiments, the liquid oil fraction 192 may have a kinematic viscosity at 100° F. from 1.8 centistokes (cSt) to 30 cSt to also help prevent plugging and other mechanical problems. As stated previously, the system embodiments of the present disclosure may reduce or eliminate the need for additives or additional processing steps to place the liquid oil fraction 192 in compliance with these standards for gas turbine fuels.

In some embodiments, additives may be used to reduce or alleviate vanadium corrosion of the gas turbine 230. In particular, magnesium compounds may be added to react with vanadium to raise the melting point of the component. Magnesium oxide (MgO) may be added to react with $V_2O_5$ to form vanadate compounds with raised melting points, such as $Mg(VO_3)_2$ (melting point 742° C.), $Mg_2V_2O_7$ (melting point 980° C.), and $Mg_3(VO_4)_2$ (melting point 1074° C.). Because the newly formed magnesium-vanadium oxides have an increased melting point, they are more stable in the gas turbine and are less likely to corrode or degrade the metallic linings and protective layers present in the gas turbine 230.

Referring again to FIG. 1, the heavy fraction 182 may be fed to a boiler 220 along with a water feed 128. The boiler 220 may power a steam turbine 228. The boiler 220 may, in some embodiments, be a supercritical water boiler or may be a superheated steam boiler. In some embodiments, the supercritical water stream 126 from the supercritical upgrading reactor 150 may integrated with the boiler 220 such that the boiler 220 and the supercritical upgrading reactor 150 may be synergistically coupled. This means that the boiler 220 and the supercritical upgrading reactor 150 may, in some embodiments, share and exchange materials, energy, or both. In some embodiments, superheated steam may be used, as supercritical water can be undesirably destructive to turbine blades. In other embodiments, supercritical water may be used as superheated steam requires decreased pressure and may be difficult to generate. In some embodiments, the water feed 128 may only need to be used to start the boiler 220. After the boiler 220 is running, water from the system, such as the supercritical water stream 126, may be used to maintain function of the boiler 220. Heavy insulation and tracing may be used throughout the lines in the process 100 to transfer the supercritical water stream 126 without significant heat loss. The supercritical water or superheated steam may produce energy 222 to drive the steam turbine 228. The steam turbine 228 may produce mechanical energy which may be converted by a generator 252 to produce electric energy 300. Excess steam 224 from the turbine 228 may be directed to a condenser for recycling back into the steam turbine 228.

As mentioned, in some embodiments, the boiler 220 may be a supercritical water boiler that operates at a temperature and a pressure greater than the critical temperature and pressure of water. In some embodiments, this may be a pressure of equal to or greater than 22 MPa and a temperature of greater than or equal to 374° C. In some embodiments, the boiler 220 may change liquid water to steam through bubbling water through heat generated by the combustion of hydrocarbons, such as those present in the heavy fraction 182. In some embodiments, a pressure reducing device may be used to convert supercritical water into superheated steam for use in the boiler 220. In other embodiments, the water feed 128 may be used, which may operate at any temperature desired for a particular application of the process 100 for producing power.

In the embodiment of FIG. 1, at least a portion of the heavy fraction 182 may be suitable as fuel for the boiler 220 with little to no additives or additional processing or purification steps. Without being bound by theory, the heavy fraction 182 may meet the specifications required of the boiler 220 due to the upgrading process of the supercritical upgrading reactor 150. The heavy fraction 182 may have a reduced metal content and may already be at a suitable temperature for introduction to the boiler 220, eliminating or reducing the need for preheating upstream of the boiler 220.

Figure 2:
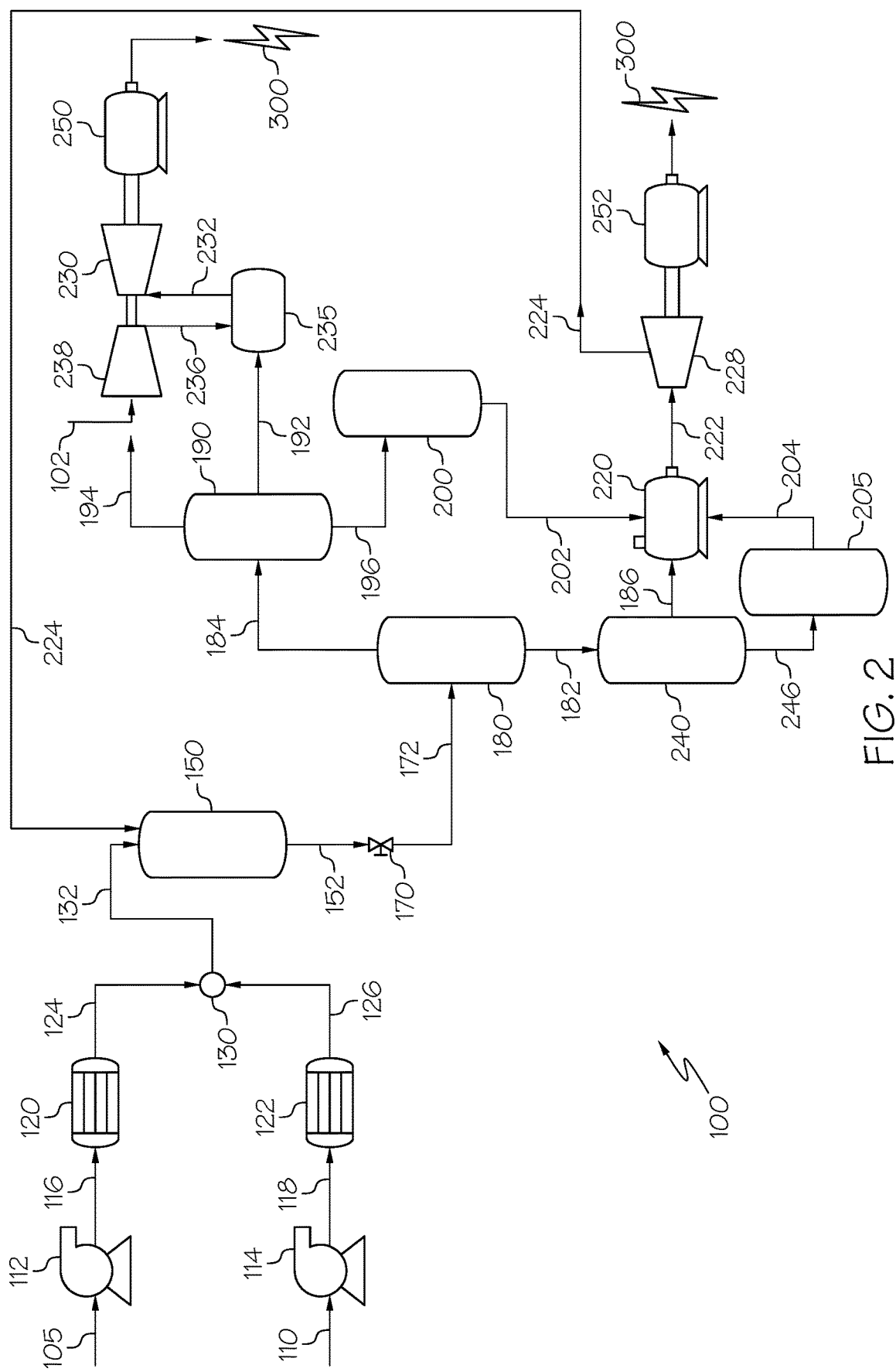
FIG. 2 is a schematic view of another process for generating power which utilizes additional treatment steps upstream of the supercritical water boiler, according to the present embodiments.

Referring now to FIG. 2, additional embodiments of the disclosure are directed to conserving the water used for steam generation in the boiler 220.

In some embodiments, the water fraction 196, which is generated from the light fraction 184 in the gas/oil/water separator 190, may undergo additional treatment steps. In some embodiments, the water fraction 196 may be passed to a water treatment unit 200 to produce a first feed water fraction 202. The water treatment unit 200 may treat the water fraction 196 in accordance with any traditional water treatment steps, including filtering, deoiling, demineralizing, and adjusting the pH of the water fraction 196. In some embodiments, the water treatment unit 200 may use physical processes, such as settling and filtration, chemical processes such as disinfection and coagulation, biological processes such as slow sand filtration to treat the water fraction 196, or any combination of these. Moreover, the water treatment unit 200 may utilize chlorination, aeration, flocculation, polyelectrolytes, sedimentation, or other techniques known to purify water to treat water fraction 196. In some embodiments, the water fraction 196 may undergo treatment to provide a water source with less contaminants for the boiler 220.

Before being introduced to the boiler 220, the first feed water fraction 202 may need to have a reduced amount of contaminants for the water to be used in the boiler 220. For instance, in some embodiments, the first feed water fraction 202 may have between 125 and 200 mass parts per billion (ppb) diethyl hydroxylamine (DEHA), such as less than 200 ppb DEHA, less than 175 ppb DEHA, or less than 150 ppb DEHA. The first feed water fraction 202 may have from 0 to 5 ppb dissolved $O_2$, such as less than 5 ppb $O_2$, less than 4 ppb $O_2$, less than 3 ppb $O_2$, or less than 2 ppb $O_2$. The first feed water fraction 202 may have less than or equal to 0.05 milligrams per liter (mg/L) hardness, such as less than or equal to 0.01 mg/L hardness. The first feed water fraction 202 may have less than or equal to 0.01 mg/L copper, less than or equal to 0.02 mg/L iron, and less than or equal to 0.05 mg/L $SiO_2$. The first feed water fraction 202 may have a pH between 8.8 and 9.2, such as a pH between 8.9 and 9.1 or a pH of 9.

Referring again to FIG. 2, the heavy fraction 182 may also undergo additional processing before being passed to the boiler 220. As shown in FIG. 2, in some embodiments the heavy fraction 182 may be passed to an oil-water separator 240 upstream of the boiler 220 to separate at least some water from the heavy fraction 182. The oil-water separator 240 may produce a dewatered heavy fraction 186 and a second water fraction 246. In some embodiments, the dewatered heavy fraction 186 may have a water content of less than or equal to 1 wt % water, such as less than or equal to 0.5 wt % water or less than or equal to 0.1 wt % water. In some embodiments, the dewatered heavy fraction 186 may have a viscosity lower than or equal to 380 cSt at 122° F., such as lower than or equal to 180 cSt at 122° F.

The dewatered heavy fraction 186 may be passed to the boiler 220. Like the heavy fraction 182 discussed with reference to FIG. 1, the dewatered heavy fraction 186 may have a low metal content and a temperature suitable for introduction to the boiler 220 with little to no additional steps or additives. The dewatered heavy fraction 186 may be fed to the boiler 220 as fuel for the steam generation step.

Again referring to FIG. 2, the second water fraction 246 may be passed to a second water treatment unit 205 to produce a second feed water fraction 204, which may or may not be introduced to the boiler 220. In some embodiments, the first feed water fraction 202 and the second feed water fraction 204 may be combined and both introduced to the boiler 220. This may conserve water to allow for a more self-sustaining process with little to no additives or additional steps. Excess steam 224 from the turbine 228 may be directed to a condenser to be reused throughout the process 100, such as recycling back into the turbine 228 or to the supercritical upgrading reactor 150. The turbine 228 and supercritical upgrading reactor 150 may be synergistic in nature and may exchange energy, materials, or both, including, but not limited to, steam 224.

Figure 3:
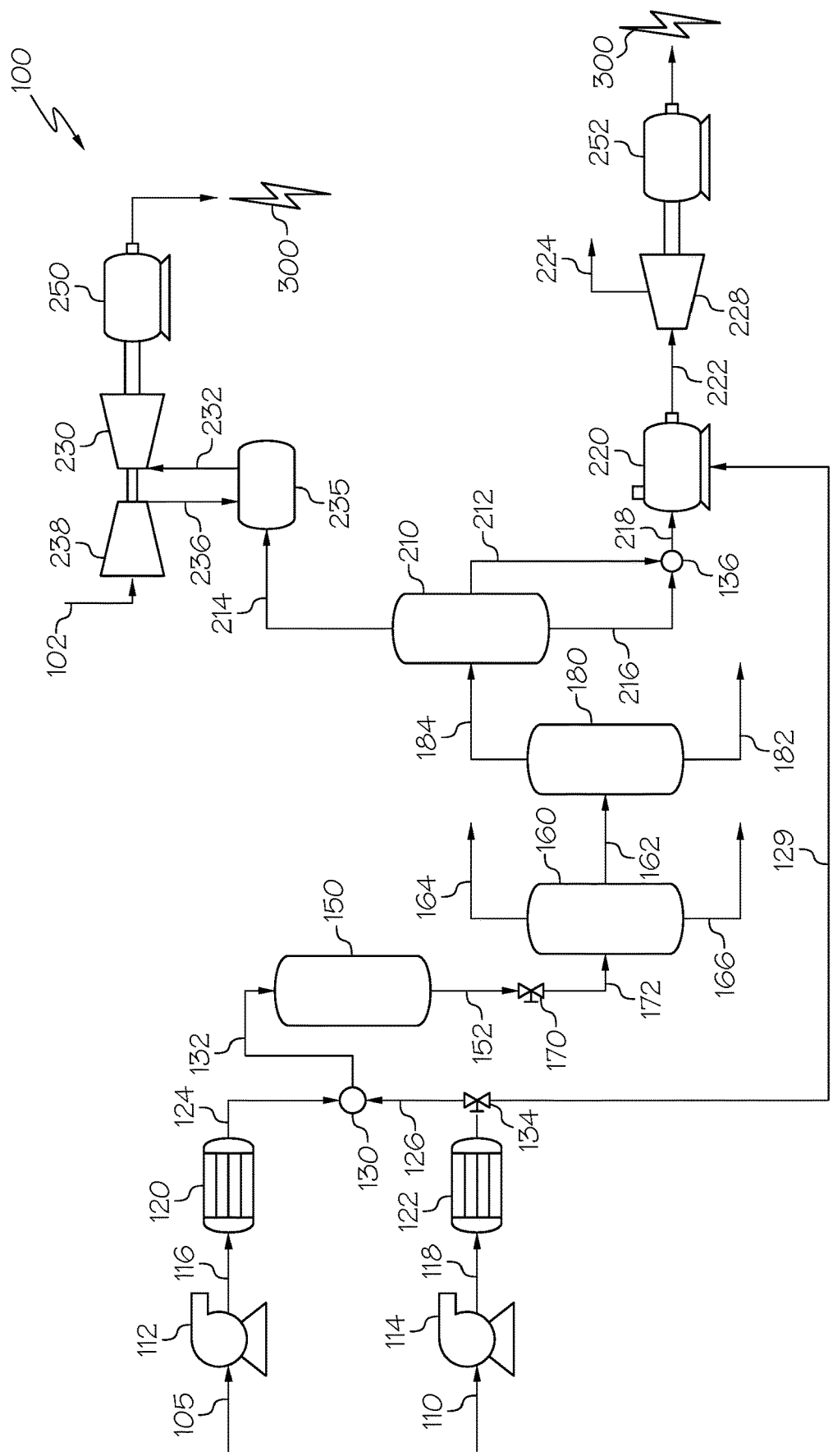
FIG. 3 is a schematic view of yet another process for generating power which utilizes an additional distillation unit upstream of the light/heavy separator, according to the present embodiments.

Looking now to FIG. 3, additional embodiments are directed to further processing the reactor product 152 upstream of the light/heavy separator 180. FIG. 3 further depicts utilizing a cutterstock fraction 212 combined with the heavy oil fraction 216 to power the boiler 220.

In FIG. 3, the depressurized stream 172 is passed to an initial gas/oil/water separator 160, where the depressurized stream 172 is separated into an initial gas fraction 164, an initial water fraction 166, and an initial oil fraction 162. The initial oil fraction 162 may be passed to a light/heavy separator 180 to be separated into a light fraction 184 and a heavy fraction 182. The light fraction 184 may be passed to a distillation unit 210. The distillation unit 210 may separate the light fraction 184 into at least a light liquid oil fraction 214, a cutterstock fraction 212 and a heavy oil fraction 216. Other fractions, while not shown, are also contemplated.

In some embodiments, the heavy oil fraction 216 may be distilled such that the fraction has a viscosity of greater than 380 cSt at 50° C. The kinematic viscosity of the heavy oil fraction 216 may, in some embodiments, be greater than 125 cSt at 100° F. The kinematic viscosity of the heavy oil fraction 216 may be greater than 100 cSt at 100° F., or may be from 100 cSt to 125 cSt, or from 100 cSt to 150 cSt at 100° F. In some embodiments the light liquid oil fraction 214 may have a kinematic viscosity at 100° F. of from 1 cSt to 5 cSt, or from 1 cSt to 10 cSt, or from 1 cSt to 20 cSt. Without being bound by theory, the cutterstock fraction 212 may be considered an intermediary between the heavy oil fraction 216 and the light liquid oil fraction 214, and may have a kinematic viscosity between that of the light liquid oil fraction 214 and the heavy oil fraction 216. The cutterstock fraction 212 may have a kinematic viscosity at 100° F. of from less than 1 cSt to 30 cSt, such as from 5 cSt to 25 cSt or from 10 cSt to 20 cSt. In some embodiments, the cutterstock fraction 212 may have a kinematic viscosity at 100° F. of from 1 cSt to 5 cSt, or 1 cSt to 20 cSt, or from 1 to 10 cSt or from 5 to 15 cSt. In some embodiments, the cutterstock fraction 212 may have a kinematic viscosity at 100° F. of less than 1 cSt, or less than 3 cSt, such as from 0 cSt to 1 cSt, or from 0 cSt to 3 cSt, or from 0 cSt to 5 cSt.

As used throughout this disclosure, kinematic viscosity refers to the ratio of absolute viscosity compared to the density of a fluid in accordance with Equation 2.

$$\text{kinematic viscosity } (cSt) = \frac{\text{absolute viscosity}\left(N\frac{s}{m^2}\right)}{\text{density}(kg/m^3)} \times \frac{10^6 cSt}{1\ m^2/s} \quad \text{EQUATION 2}$$

The cutterstock fraction 212 may be comprised of naphtha, kerosene, or combinations thereof, or may, in some embodiments, be comprised of other suitable hydrocarbons. The cutterstock fraction 212 may, in some embodiments, be combined with the heavy oil fraction 216 to decrease the viscosity of the heavy oil fraction 216. The cutterstock fraction 212 may be combined with the heavy oil fraction 216 in a mixer 136. The mixer may be any suitable mixer, such as a simple mixing tee, an ultrasonic device, a small continuous stir tank reactor (CSTR), or any other suitable mixers. The cutterstock fraction 212 may be mixed with the heavy oil fraction 216 to produce a fuel oil fraction 218.

The cutterstock fraction 212 may have a lesser viscosity than the heavy oil fraction 216. Additionally, the cutterstock fraction 212 may have a lesser sulfur content than the heavy oil fraction 216. Therefore, the addition of the cutterstock fraction 212 to the heavy oil fraction 216 may reduce the viscosity of the heavy oil fraction 216, reduce the sulfur content of the heavy oil fraction 216, or both, to produce an upgraded fuel oil fraction 218. The fuel oil fraction 218 may be suitable for use as fuel in a boiler 220 without or with a reduced need for additives or additional processing steps. In some embodiments, the need for additional processing steps or additives may be reduced. Without being bound by theory, the processing of the supercritical upgrading reactor 150 in combination with the initial gas/oil/water separator 160, light/heavy separator 180, and the distillation unit 210, may produce an upgraded fuel oil fraction 218 that is able to meet the specifications required for suitable fuel in the boiler 220.

The fuel oil fraction 218 may have an API value of from 10° to 15°, such as 13°. The fuel oil fraction 218 may have an API value of from 5° to 20°, or from 10° to 20°, or from 5° to 25°, or from 10° to 25°. The fuel oil fraction 218 may have an API value of from 12° to 14°, or from 15° to 18°, or from 12° to 18°. The cutterstock fraction 212 may have a boiling point range of from 30° C. to 250°, such as from 30° C. to 150° C. or from 150° C. to 250° C. The $T_5$ TBP of the fuel oil fraction 218 may be from 100° C. to 200° C., or from 100° C. to 150° C., or from 100° C. to 125° C., or from 75° C. to 125° C. The $T_{90}$ TBP of the fuel oil fraction 218 may be from 800° C. to 900° C., or from 850° C. to 900° C., or from 850° C. to 875° C.

Still referring to FIG. 3, the fuel oil fraction 218 may be passed to the boiler 220 to be used as fuel. A supercritical water feed 129 may also be used to power the boiler 220. The supercritical water feed 129 may be produced from the water pump 114 and water pre-heater 122 previously described with reference to FIG. 1. In some embodiments, the supercritical water stream 126 may be split with a partitioning valve 134 to produce the supercritical water feed 129. The boiler 220 may generate steam 222 to drive the steam turbine 228. The steam turbine may additionally utilize an exhaust mechanism to discharge excess steam 224 in some embodiments. The steam turbine 228 may generate mechanical energy to power a generator 252 to produce electric energy 300.

Similar to the embodiments described with reference to FIG. 1, the light liquid oil fraction 214 may be passed to a combustor 235 to generate heated compressed air 232 to power a gas turbine 230. The gas turbine 230 may generate mechanical energy to power an electric generator 250 and produce electric energy 300.

Figure 4:
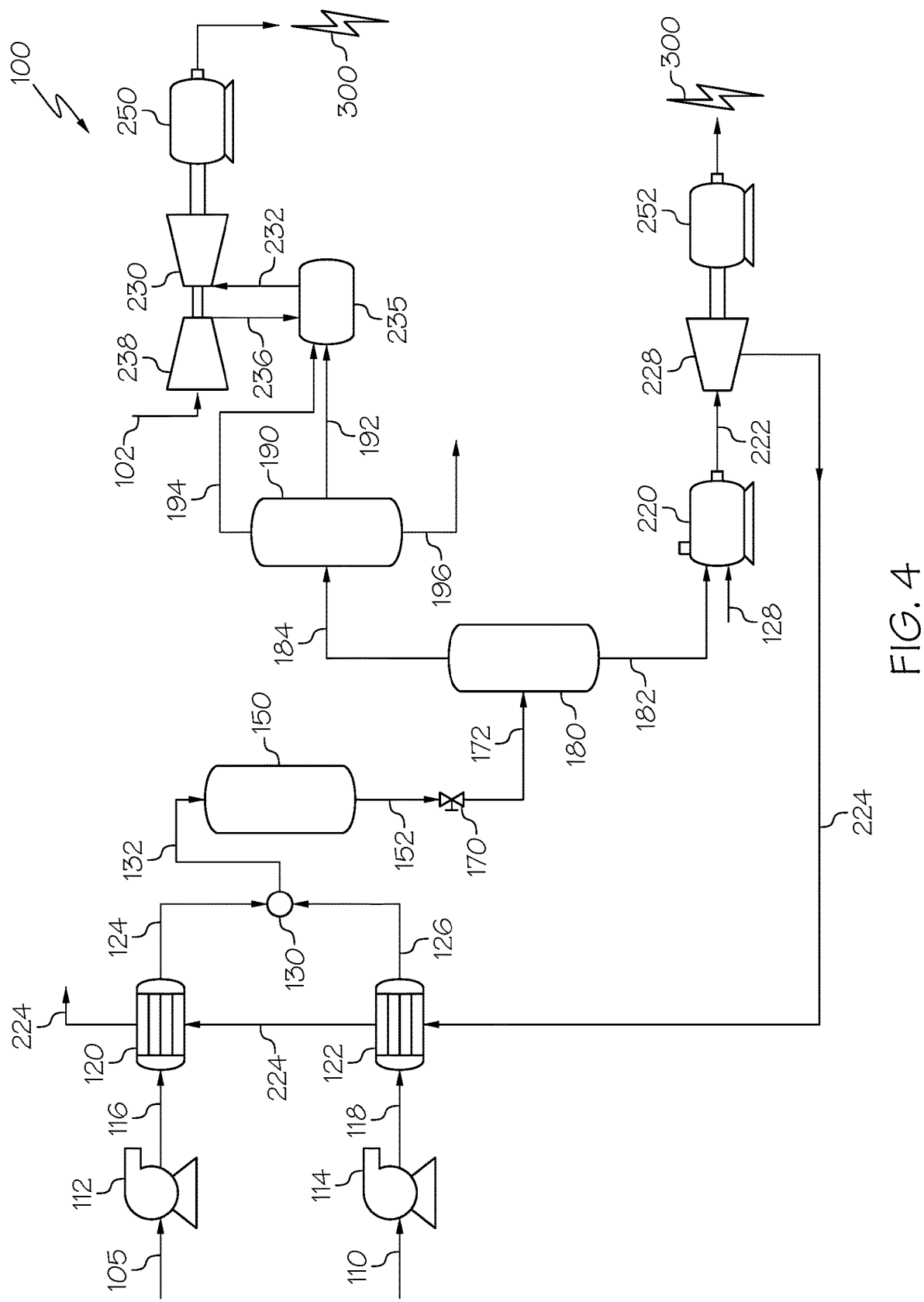
FIG. 4 is a schematic view of another process for generating power which recycles steam generated in the supercritical water boiler to the preheaters upstream of the supercritical water reactor, according to the present embodiments.

Referring now to FIG. 4, additional embodiments are directed to conserving and minimizing the steam requirements in the system. FIG. 4 depicts that, in some embodiments, the steam 224 effluent from the steam turbine 228 may be recycled and passed to the pre-heaters 120, 122 upstream of the supercritical upgrading reactor 150 to heat the pressurized hydrocarbon-based composition 116 and the pressurized water stream 118. Alternatively as shown in the embodiments of FIG. 2, the steam 224 may be additionally recycled into the supercritical upgrading reactor 150. The processes of the present disclosure may minimize water consumption while utilizing numerous fractions of the combined feed stream 132 to create an exceedingly efficient system for power generation.

Figure 5:
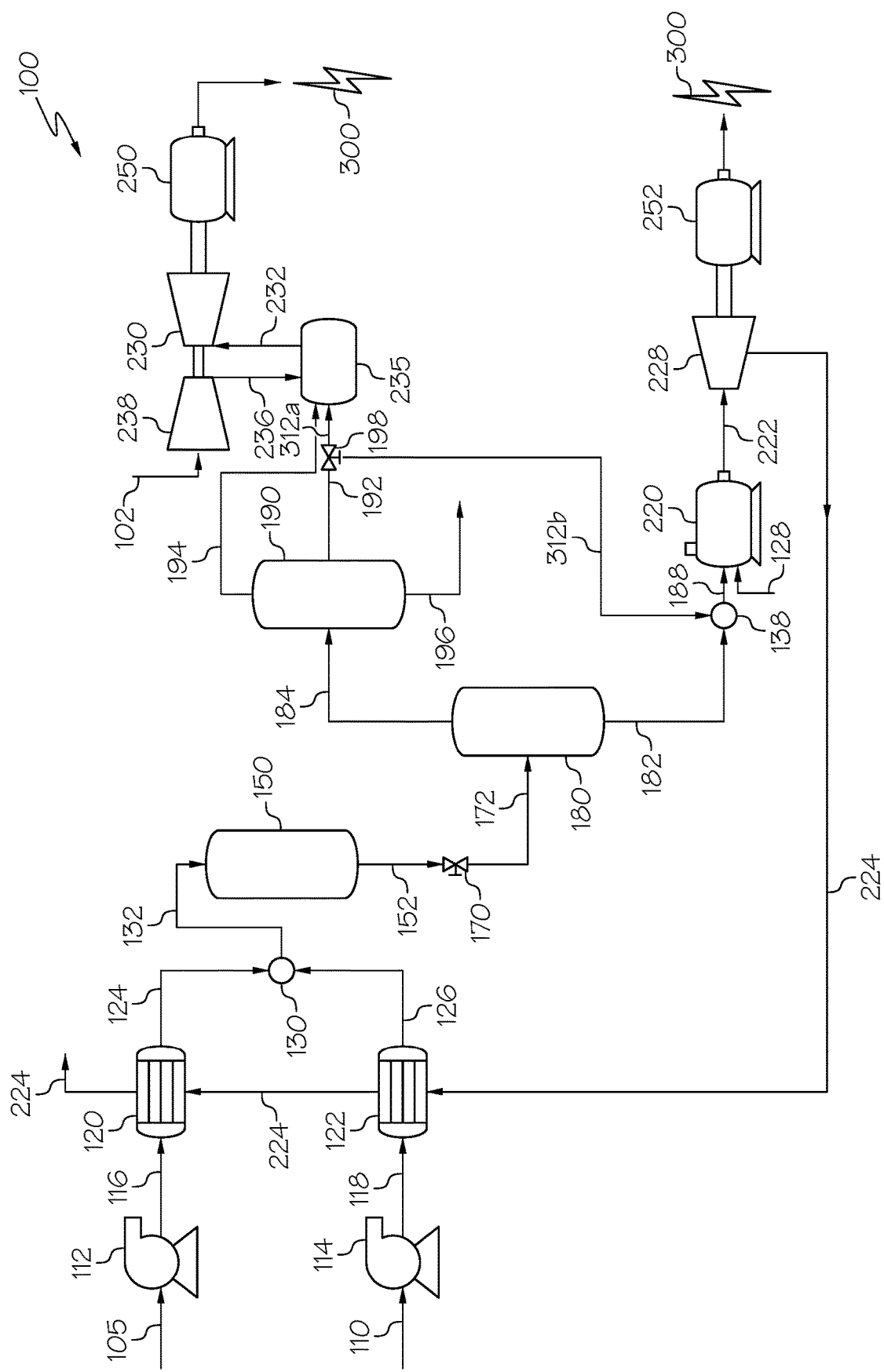
FIG. 5 is a schematic view of another process for generating power in which cutterstock is used to reduce the viscosity of heavy fraction used as fuel in the supercritical boiler, according to the present embodiments.

Looking now to FIG. 5, FIG. 5 is another schematic depiction of a process for generating electric power similar to the embodiments depicted in FIGS. 1-4. It should be understood that any of the embodiments previously discussed with reference to FIGS. 1 to 4 are contemplated for use in the process of FIG. 5. Additionally, FIG. 5 depicts utilizing cutterstock fractions 312A and 312B.

In FIG. 5, a light/heavy separator 180 is used to separate the depressurized stream 172 into a heavy fraction 182 and a light fraction 184. The light fraction 184 may then be passed to a gas/oil/water separator 190, which may separate the light fraction 184 into a gas fraction 194, a liquid oil fraction 192, and a water fraction 196.

The liquid oil fraction 192 may then be split into two streams of cutterstock fractions 312A and 312B via a flow splitter 198. The flow splitter 198 may be any known splitting device able to separate the liquid oil fraction 192 into at least two steams of cutterstock fractions 312A and 312B. As shown in FIG. 5, in some embodiments, one stream of cutterstock fraction 312A may be passed as fuel to the combustor 235. Additionally, the gas fraction 194 may be passed to the combustor 235 as fuel. By utilizing multiple components of the reactor product 152, the process for generating electricity may minimize the fuel requirements necessary for generating electric power.

Referring again to FIG. 5, another stream of cutterstock fraction 312B may be passed to a mixer 138, where it is mixed with the heavy fraction 182 to form a mixed fuel fraction 188. The mixer 138 may be any suitable mixer known in the art, such as a simple mixing tee, ultrasonic device, a small continuous stir tank reactor (CSTR), or another known mixer. As previously mentioned, the heavy fraction 182, the mixed fuel fraction 188, or both may, in some embodiments, be dewatered through an oil-water separator 240 discussed with reference to FIG. 2.

The mixed fuel fraction 188 may then be passed to a boiler 220. The boiler 220 may power the steam turbine 228 to power the generator 252 and produce electric energy 300, as previously described with reference to FIGS. 1-4.

EXAMPLES

The following simulation examples illustrate one or more embodiments of the present disclosure previously discussed. Specifically, a simulation was carried out in accordance with the previously described embodiments, particularly with respect to the embodiment of the process for generating electricity depicted in FIG. 5. The reaction conditions for the process are listed in Table 1, and the compositional properties of the constituents are listed in Table 2, which are listed both by name and by the reference number used in FIG. 5.

In the Example process for generating electricity, a hydrocarbon-based (HC-based) composition (comp.) 105 was pressurized in a pump to create a pressurized (pres.) hydrocarbon-based composition 116 with a pressure of 3901 pounds per square inch gauge (psig). A water stream 110 was also pressurized to form a pressurized water stream 118 to a pressure of 3901 psig. The pressurized hydrocarbon-based composition 116 was pre-heated from a temperature of 26° C. to 150° C. The pressurized water stream 118 was also pre-heated from a temperature of 22° C. to a temperature of 450° C. to form a supercritical water stream 126. The supercritical water stream 126 and the pressurized, heated hydrocarbon-based composition 124 were mixed in a feed mixer to produce a combined feed stream 132, which was introduced to a supercritical upgrading reactor to generate a reactor product 152. The reactor product 152 (pressure 3901 psig) was depressurized by a valve into depressurized stream 172 (pressure 5 psig). The depressurized stream 172 was fed to a flash drum to separate the depressurized stream 172 into a heavy fraction 182 and a light fraction 184.

The light fraction 184 was then passed to a gas/oil/water separator to separate the light fraction 184 into a gas fraction 194, a liquid oil fraction 192, and a water fraction 196. The liquid oil fraction 192 was then split into two streams of cutterstock fractions 312A and 312B. One stream of cutterstock fraction 312A was passed to the gas turbine, while the other stream of cutterstock fraction 312B was mixed with the heavy fraction 182 to create a mixed fuel fraction 188 to be passed to the boiler. The mixed fuel fraction was passed to a supercritical steam boiler in communication with a steam turbine and a generator which produced electrical energy.

Likewise, the cutterstock fraction 312A and the gas fraction 194 were passed to a combustor to produce compressed heated air to drive a gas turbine. The gas turbine produced mechanical energy which was converted to electric energy in a powered an electric generator. The steam 224 from the boiler was recycled and passed back to the petroleum and water pre-heaters, with the excess steam collected from the petroleum pre-heater.

Notably, the Example process was able to generate power without supplying external energy to the system, without supplying fuel gas to the system, and without the need for cooling and reheating the constituents before introduction to the gas turbine, the boiler, or both. The Example process consumed a minimal amount of water and was able to recycle the water fractions (steam 224) to heat the pre-heaters and continue the process. The cutterstock fractions 312A and 312B produced which were used to fuel the turbine and boiler met the specifications required for fuel gas without the use of additives to reduce the metal or sulfur contents of the fraction. The gas fraction 194 was also used to power the combustor to generate energy, utilizing almost every fraction of the original combined feed stream 132. By utilizing so many upgraded, separated components of the combined feed stream 132, the Example process was able to generate more fuel in a more efficient, self-sustaining system, which saves time and money.

TABLE 1

Reaction Conditions

| | Name<br>FIG. Ref. No. | | | | |
|---|---|---|---|---|---|
| | HC-based composition<br>105 | Water Stream<br>110 | Pres. HC-Based Comp.<br>116 | Pres. Water Stream<br>118 | Supercritical Water Stream<br>126 |
| Temperature [° C.] | 20 | 20 | 26 | 22 | 450 |
| Pressure [psig] | 1 | 1 | 3901 | 3901 | 3901 |
| Mass Flow [kf/h] | 118591 | 132223 | 118591 | 132223 | 132223 |
| Liquid Volume Flow [barrel/day] | 20000 | 20000 | 20000 | 20000 | 20000 |

TABLE 1-continued

Reaction Conditions

| | Pres. Heated HC-based Comp. 124 | Combined Feed Stream 132 | Reactor Product 152 | Depres. Stream 172 | Heavy Fraction 182 | Light Fraction 184 |
|---|---|---|---|---|---|---|
| Temperature [° C.] | 150 | 378 | 450 | 355 | 355 | 355 |
| Pressure [psig] | 3901 | 3901 | 3901 | 5 | 5 | 5 |
| Mass Flow [kg/h] | 118591 | 250814 | 250814 | 250814 | 38316 | 212497 |
| Liquid Volume Flow [barrel/day] | 20000 | 40000 | 40275 | 40275 | 5590 | 34685 |

| | Gas Fraction 194 | Water Fraction 196 | Second Water Fraction 246 | Steam 244 |
|---|---|---|---|---|
| Temperature [° C.] | 70 | 70 | 20 | 358 |
| Pressure [psig] | 5 | 5 | 3611 | 101 |
| Mass Flow [kg/h] | 8649 | 131546 | 307535 | 307535 |
| Liquid Volume Flow [barrel/day] | 1903 | 19900 | 46518 | 46518 |

| | Liquid Oil Fraction 192 | Cutterstock to turbine 212 | Cutterstock to boiler 212 | Mixed Fuel to boiler 188 |
|---|---|---|---|---|
| Temperature [° C.] | 70 | 70 | 70 | 277 |
| Pressure [psig] | 5 | 5 | 5 | 5 |
| Mass Flow [kg/h] | 72303 | 57842 | 14461 | 52777 |
| Liquid Volume Flow [barrel/day] | 12882 | 10305 | 2576 | 8167 |

In Table 1, the temperature is measured in degrees Celsius, "° C." The pressure is pounds per square inch gauge "psig." The mass flow is in Kilograms per hour "kg/h." The Liquid Volume Flow is measured in barrels per day "barrel/day," referring to the standard ideal liquid volume flow, which can be calculated using Equation 1:

$$\text{Standard Ideal Volume Flow} = \frac{\text{Total Molar Flow} \times \text{Molecular Weight of the Stream}}{\text{Ideal Density of the Stream}} \quad \text{Equation 1}$$

TABLE 2

Constituent Properties

| | | HC-based Composition 105 | Heavy Fraction 182 | Cutterstock to turbine 212 | Mixed Fuel 188 |
|---|---|---|---|---|---|
| Specific Gravity(API) | | 26.4 | 5.1 | 35.3 | 13.4 |
| Distillation (TBP, ° C.) | 5% | 39 | 517 | 41 | 117 |
| | 10% | 46 | 552 | 56 | 198 |
| | 30% | 249 | 631 | 188 | 485 |
| | 50% | 377 | 703 | 286 | 621 |
| | 70% | 521 | 788 | 377 | 728 |
| | 90% | 709 | 886 | 489 | 861 |
| Sulfur Content (wt %) | | 3.6 | 4.1 | 1.3 | 3.4 |
| Conradson Carbon Content (wt %) | | 10.4 | 6.8 | 0.3 | 5.0 |
| Kinematic Viscosity @ 100° F.(cSt) | | 14 | 127 | 4 | 22 |
| Vanadium Content (wt ppm) | | 33.0 | 33.4 | <0.1 | 24.3 |

A first aspect of the disclosure is directed to a process for generating electric power, the process comprising: combining a supercritical water stream with a pressurized, heated hydrocarbon-based composition in a mixing device to create a combined feed stream; introducing the combined feed stream into a supercritical reactor, in which the supercritical reactor operates at a temperature greater than a critical temperature of water and a pressure greater than a critical pressure of water, to produce an upgraded product; depressurizing the upgraded product; separating the upgraded product into at least one light and at least one heavy fraction, in which hydrocarbons in the light fraction have an American Petroleum Institute (API) gravity value that is greater than hydrocarbons in the heavy fraction; and introducing at least a portion of the heavy fraction to a boiler to generate electric power, introducing at least a portion of the light fraction to a gas turbine to generate electric power, or both.

A second aspect of the disclosure includes the first aspect, in which the hydrocarbons in the light fraction have an API gravity value of greater than or equal to 30°.

A third aspect of the disclosure includes the first or second aspects, in which the hydrocarbons in the heavy fraction have an API gravity value of less than 30°.

A fourth aspect of the disclosure includes any of the first through third aspects, in which the hydrocarbons in the heavy fraction have an API gravity value of less than 30° and greater than or equal to 20°.

A fifth aspect of the disclosure includes any of the first through fourth aspects, further comprising passing the light fraction to an oil/gas/water separator to produce a gas fraction, a liquid oil fraction, and a water fraction.

A sixth aspect of the disclosure includes the fifth aspect, in which the liquid oil fraction has a metal content of less than 10 weight parts per million (wt ppm) metal.

A seventh aspect of the disclosure includes the fifth and sixth aspects, in which the liquid oil fraction is passed to a turbine system to generate power.

An eighth aspect of the disclosure includes the fifth and sixth aspects, in which the gas fraction is passed to a turbine system to generate power.

A ninth aspect of the disclosure includes the seventh through eighth aspects, in which the turbine system comprises a combustor and a gas turbine.

A tenth aspect of the disclosure includes any of the fifth through ninth aspects, further comprising passing the water fraction to a water treatment unit to produce a feed water fraction.

An eleventh aspect of the disclosure includes any of the first through tenth aspects, further comprising passing the at least one heavy fraction to an oil-water separator to separate at least some water from the heavy fraction to produce a dewatered heavy fraction.

A twelfth aspect of the disclosure includes the eleventh aspect, in which the dewatered heavy fraction has a water content of less than or equal to 1 wt % water.

A thirteenth aspect of the disclosure includes the eleventh aspect, in which the dewatered heavy fraction has a water content of less than or equal to 0.5 wt % water.

A fourteenth aspect of the disclosure includes the eleventh aspect, in which the dewatered heavy fraction has a water content of less than or equal to 0.1 wt % water.

A fifteenth aspect of the disclosure includes any of the eleventh through fourteenth aspects, in which the dewatered heavy fraction has a viscosity of less than or equal to 380 centistokes (cSt).

A sixteenth aspect of the disclosure includes any of the eleventh through fifteenth aspects, in which the dewatered heavy fraction has a viscosity of less than or equal to 180 cSt.

A seventeenth aspect of the disclosure includes any of the eleventh through sixteenth aspects, further comprising passing the second water fraction to the water treatment unit to produce a second feed water fraction.

An eighteenth aspect of the disclosure includes any of the eleventh through seventeenth aspects, further comprising introducing the first feed water fraction, the second feed water fraction, or both to the boiler.

A nineteenth aspect of the disclosure includes any of the first through eighteenth aspects, in which the boiler is a supercritical water boiler where the supercritical water boiler operates at a temperature greater than a critical temperature of water and a pressure greater than a critical pressure of water.

A twentieth aspect of the disclosure includes any of the first through nineteenth aspects, in which separating the upgraded product comprises passing the upgraded product to at least one distillation unit.

A twenty-first aspect of the disclosure includes any of the first through twentieth aspects, in which separating the upgraded product comprises passing the upgraded product to a flash drum.

A twenty-second aspect of the disclosure includes any of the first through twenty-first aspects, further comprising cooling the upgraded product before depressurizing the upgraded product.

A twenty-third aspect of the disclosure includes any of the first through twenty-second aspects, further comprising passing steam from the boiler and heating the heated, pressurized hydrocarbon-based composition, the supercritical water stream, or both.

A twenty-fourth aspect of the disclosure refers to a process for generating electric power, the process comprising: combining a supercritical water stream with a pressurized, heated hydrocarbon-based composition in a mixing device to create a combined feed stream; introducing the combined feed stream into a supercritical reactor, where the supercritical reactor operates at a temperature greater than a critical temperature of water and a pressure greater than a critical pressure of water; depressurizing the upgraded product; separating the upgraded product in at least one gas/oil/water separator to produce at least a gas fraction, a liquid oil fraction, and a water fraction; separating the liquid oil fraction in a distillation unit to produce at least a light oil fraction, a cutterstock fraction, and a heavy oil fraction; combining at least cutterstock fraction and the heavy fraction to produce a fuel oil fraction; and passing the light oil fraction to a gas turbine system to generate electric power, passing the fuel oil fraction to a boiler to generate electric power, or both.

A twenty-fifth aspect of the disclosure includes the twenty-fourth aspect, in which hydrocarbons in the light oil fraction have an API gravity value of greater than or equal to 30°.

A twenty-sixth aspect of the disclosure includes the twenty-fourth through twenty-fifth aspects, in which hydrocarbons in the heavy oil fraction have an API gravity value of less than 30°.

A twenty-seventh aspect of the disclosure includes any of the twenty-fourth through twenty-sixth aspects, in which the hydrocarbons in the heavy oil fraction have an API gravity value of less than 30° and greater than or equal to 20°.

A twenty-eighth aspect of the disclosure includes any of the twenty-fourth through twenty-seventh aspects, further comprising passing the water fraction to a water treatment unit to produce a first feed water fraction.

A twenty-ninth aspect of the disclosure includes any of the twenty-fourth through twenty-eighth aspects, in which the liquid oil fraction has a metal content of less than 10 weight parts per million (wt ppm) metal.

A thirtieth aspect of the disclosure includes any of the twenty-fourth through twenty-ninth aspects, further comprising passing the at least one heavy oil fraction to an oil-water separator to separate at least some water from the heavy oil fraction to produce a dewatered heavy fraction and a second water fraction.

A thirty-first aspect of the disclosure includes the thirtieth aspect, in which the dewatered heavy fraction has a water content of less than or equal to 1 wt % water.

A thirty-second aspect of the disclosure includes the thirtieth aspect, in which the dewatered heavy fraction has a water content of less than or equal to 0.5 wt % water.

A thirty-third aspect of the disclosure includes the thirtieth aspect, in which the dewatered heavy fraction has a water content of less than or equal to 0.1 wt % water.

A thirty-fourth aspect of the disclosure includes any of the thirtieth through thirty-third aspects, in which the dewatered heavy fraction has a viscosity of less than or equal to 380 cSt at 122° F.

A thirty-fifth aspect of the disclosure includes any of the thirtieth through thirty-fourth aspects, in which the dewatered heavy fraction has a viscosity of less than or equal to 180 cSt at 122° F.

A thirty-sixth aspect of the disclosure includes any of the thirtieth through thirty-fifth aspects, further comprising passing the second water fraction to the water treatment unit to produce a second feed water fraction.

A thirty-seventh aspect of the disclosure includes the thirty-sixth aspect, further comprising introducing the first feed water fraction, the second feed water fraction, or both to the boiler.

A thirty-eighth aspect of the disclosure includes any of the twenty-fourth through thirty-seventh aspects, in which the boiler is a supercritical water boiler that operates at a temperature greater than a critical temperature of water and a pressure greater than a critical pressure of water.

A thirty-ninth aspect of the disclosure includes any of the twenty-fourth through thirty-eighth aspects, in which separating the upgraded product comprises passing the upgraded product to at least one distillation unit.

A fortieth aspect of the disclosure includes any of the twenty-fourth through thirty-ninth aspects, in which separating the upgraded product comprises passing the upgraded product to a flash drum.

A forty-first aspect of the disclosure includes any of the twenty-fourth through fortieth aspects, in which the cutterstock fraction comprises naphtha, kerosene, or combinations thereof.

A forty-second aspect of the disclosure includes any of the twenty-fourth through forty-first aspects, further comprising passing steam from the boiler to at least one pre-heater.

A forty-third aspect of the disclosure includes any of the twenty-fourth through forty-second aspects, further comprising introducing steam from the boiler to the supercritical upgrading reactor.

A forty-fourth aspect of the disclosure includes any of the twenty-fourth through forty-third aspects, further comprising passing the gas fraction to the gas turbine system to generate electric power.

It should be apparent to those skilled in the art that various modifications and variations may be made to the embodiments described within without departing from the spirit and scope of the claimed subject matter. Thus, it is intended that the specification cover the modifications and variations of the various embodiments described within provided such modification and variations come within the scope of the appended claims and their equivalents.

As used throughout the disclosure, the singular forms "a," "an" and "the" include plural referents unless the context clearly dictates otherwise. Thus, for example, reference to "a" component includes aspects having two or more such components, unless the context clearly indicates otherwise.

Having described the subject matter of the present disclosure in detail and by reference to specific embodiments thereof, it is noted that the various details disclosed within should not be taken to imply that these details relate to elements that are essential components of the various embodiments described within, even in cases where a particular element is illustrated in each of the drawings that accompany the present description. Further, it should be apparent that modifications and variations are possible without departing from the scope of the present disclosure, including, but not limited to, embodiments defined in the appended claims. More specifically, although some aspects of the present disclosure are identified as particularly advantageous, it is contemplated that the present disclosure is not necessarily limited to these aspects.

What is claimed is:

1. A process for generating electric power, the process comprising:
    combining a supercritical water stream with a pressurized, heated hydrocarbon-based composition in a mixing device to create a combined feed stream;
    introducing the combined feed stream into a supercritical reactor, where the supercritical reactor operates at a temperature greater than a critical temperature of water and a pressure greater than a critical pressure of water;
    depressurizing the upgraded product;
    separating the upgraded product in at least one gas/oil/water separator to produce at least a gas fraction, a liquid oil fraction, and a water fraction;
    separating the liquid oil fraction in a distillation unit to produce at least a light oil fraction, a heavy oil fraction, and a cutterstock fraction comprising naphtha, kerosene, or both, where the cutterstock fraction has a $T_5$ boiling point ranging from 30° C. to 150° C.;
    combining at least the cutterstock fraction and the heavy oil fraction to produce a fuel oil fraction; and
    passing the light oil fraction to a gas turbine system to generate electric power,
    passing the fuel oil fraction to a boiler to generate electric power, or both.

2. The process of claim 1, in which hydrocarbons in the light oil fraction have an API gravity value of greater than or equal to 30° and the hydrocarbons in the heavy oil fraction have an API gravity value of less than 30°.

3. The process of claim 1, further comprising passing the water fraction to a water treatment unit to produce a first feed water fraction.

4. The process of claim 1, in which the liquid oil fraction has a metal content of less than 10 weight parts per million (wt ppm) metal.

5. The process of claim 1, further comprising passing the at least one heavy oil fraction to an oil-water separator to separate at least some water from the heavy oil fraction to produce a dewatered heavy fraction and a second water fraction.

6. The process of claim 5, in which the dewatered heavy fraction has a water content of less than or equal to 1 wt % water.

7. The process of claim 5, in which the dewatered heavy fraction has a viscosity of less than or equal to 380 cSt at 122° F.

8. The process of claim 5, further comprising passing the second water fraction to a water treatment unit to produce a second feed water fraction.

9. The process of claim 8, further comprising introducing a first feed water fraction, the second feed water fraction, or both to the boiler.

10. The process of claim 1, further comprising passing steam from the boiler to at least one pre-heater.

11. The process of claim 1, further comprising introducing steam from the boiler to the supercritical reactor.

12. The process of claim 1, further comprising passing the gas fraction to the gas turbine system to generate electric power.

* * * * *